United States Patent [19]
Herrmann et al.

[11] 4,183,045
[45] Jan. 8, 1980

[54] CHROMA KEYING SELECTOR SYSTEM

[75] Inventors: Donald C. Herrmann, Hartsville, Pa.;
Lucas J. Bazin, Vincentown, N.J.

[73] Assignee: RCA Corporation, New York, N.Y.

[21] Appl. No.: 938,244

[22] Filed: Aug. 30, 1978

[51] Int. Cl.² ............................................. H04N 5/22
[52] U.S. Cl. ............................................... 358/22
[58] Field of Search ............................. 358/21 R, 22

[56] References Cited
U.S. PATENT DOCUMENTS

| | | | |
|---|---|---|---|
| 3,560,638 | 2/1971 | Skrydstrup et al. | 358/22 |
| 3,678,182 | 7/1972 | Boxman et al. | 358/22 |
| 3,959,813 | 5/1976 | Legler | 358/22 |
| 4,051,520 | 9/1977 | Davidse et al. | 358/22 |

Primary Examiner—Robert L. Griffin
Assistant Examiner—Aristotelis M. Psitos
Attorney, Agent, or Firm—Eugene M. Whitacre; Paul J. Rasmussen; Robert L. Troike

[57] ABSTRACT

A remotely controlled chroma keyer is provided which is responsive to the red, green and blue signals from a video source such as a color camera for providing color difference signals. A signal processing system using quadrant multipliers is used for summing and differencing these color difference signals which when applied to a non-additive mixer select a particular color. The color selection is determined by control voltages applied to the multipliers.

8 Claims, 2 Drawing Figures

CHROMA KEYING SELECTOR SYSTEM

BACKGROUND OF THE INVENTION

This invention relates to an improved chroma keying system and to an improved circuitry for use therewith that can be continuously adjusted to select any color of interest from a video source.

Chroma keying systems are available commercially in broadcast equipment. These chroma keying systems are used where it is desired to place a second video signal in the background of a first video signal. For example, during a TV news broadcast it may be desirable to display a news event from a second camera in the background of the news reporter in front of a first camera. This is done with a chroma keyer by having a background of a particular color, such as blue, for example, which is not generally found in skin tones. The chroma keyer would be responsive to signals picked up from the first color camera having this blue color for switching in the signal from the second camera or video source that contains the news event to be displayed.

It is desirable that this chroma keying system be as selective as possible in order that the system not key on adjacent colors. For example, some reporters may have blue eyes which are so closely related in the system to the chroma keying color in the background that the reporter's eyes would be blanked and the scene from the second camera appear at the eyes. It is also desirable that this selective control be an adjustable control where any color may be selected from the video source so as to establish any keying signal and further it is highly desirable to provide a remote control of this keying signal. It is desirable that a control of this chroma keying be remote and not at the camera location so that the person controlling the mixing of the two or more cameras would be able to select the keying signal.

A chroma keying system with remote control with adjustable color is described in U.S. Pat. No. 3,560,638 of Skrydstrup et al. In this system, a filter produces a signal having the form $(R-Y) \sin \theta + (B-Y) \cos \theta$, where $\theta$ is a function of control voltages applied to voltage controlled amplifiers in the filter. The filter acts to provide a maximum transfer (lowest loss) at a desired color selected by the control voltages. The switching to the second camera occurs only when the signal level from the filter exceeds a given threshold level which threshold level is overcome at the particular desired color passed by the filter. While the arrangement in the patent described above may provide a threshold voltage for certain selected colors with little difficulty, this system does not have the sharp rise time characteristic desired to reject nearby colors. In an effort to overcome this problem, chroma keying arrangements have been developed using the red, green and blue difference signals and non-additive mixers. Switching circuits using diodes for example have been used to combine color difference signals to the non-additive mixer to provide a number of pre-selected color signals according to the diode biasing. It is desirable to provide a system which is variable between these preselected colors remotely where these output signals would have the sharp rise time characteristics necessary to reject the nearby colors.

SUMMARY OF THE INVENTION

Briefly, an improved chroma selection system is described comprising a first differencing means responsive to the red, green and blue signals from a video source for providing first, second and third different difference signals. The first and second difference signals are additively summed. The first and second difference signals are differentially summed in a second differencing means to provide a fourth difference signal. The additively summed first and second difference signals are differentially summed in a third differencing means with the fourth difference signal to provide a fifth difference signal. Similarly, the second and third difference signals are additively summed and are differentially summed in a fourth differencing means with the additively summed and differentially summed second and third difference signals differentially summed in a fifth difference means to provide a seventh difference signal. The fifth and seventh difference signals are non-additively mixed to pass a particular color with minimum loss and provide a chroma keying signal. The second and fourth differencing means are adjusted to thereby change the particular color selected to form the chroma keying signal.

DESCRIPTION OF THE INVENTION

Figure 1:
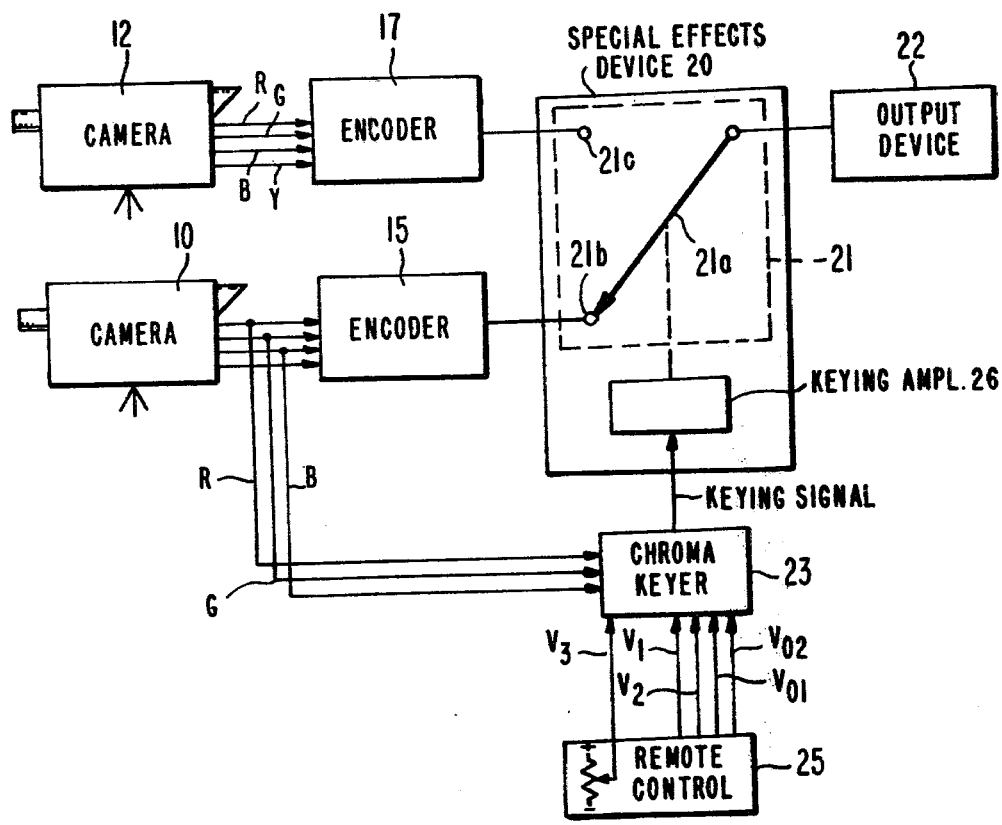
FIG. 1 is a block diagram of a chroma keying system.

Referring to FIG. 1 there is illustrated an overall system in which the present invention is employed. Cameras 10 and 12, respectively, apply non-encoded red, green, blue and luminance signals to encoders 15 and 17. A special effects selector switch 21 in special effects device 20 selects either the encoded signals from camera 10 or camera 12 to output device 22. The camera 10 may be, for example, directed to a news reporter in the studio with a blue background, for example, and the camera 12 may be directed to a different scene. Signals from the encoder 15 are normally applied by electronic selector switch 21 via arm 21a and terminal 21b to the output device 22. The red, blue and green signals from camera 10, for example, are applied to the chroma keyer 23. A control signal from a remote control unit 25 applies voltage level signals to the chroma keyer 23 to select the particular chroma signal passed by the keyer which matches the blue background. When the signal from the camera 10 reaches the particular blue color of the background, the signal level in the keyer is of sufficient amplitude to overcome a threshold level in the chroma keyer to provide a keying signal to keying amplifier 26 in the special effects device 20. The amplified keying signal from amplifier 26 causes arm 21a to switch position so as to make contact with terminal 21c and apply the output from camera 12 to the output device 22. The cameras 10 and 12 are synchronous so that the video from camera 12 is put in the right position. Signals off of the selected color are not passed with sufficient amplitude to overcome the threshold and switch arm 21a. The switch 21 is preferably an analog switch which may be like that described in applicant's docket No. RCA 73,034 entitled, "Remotely Controllable Low Pass Filter" filed on even date herewith.

Figure 2:
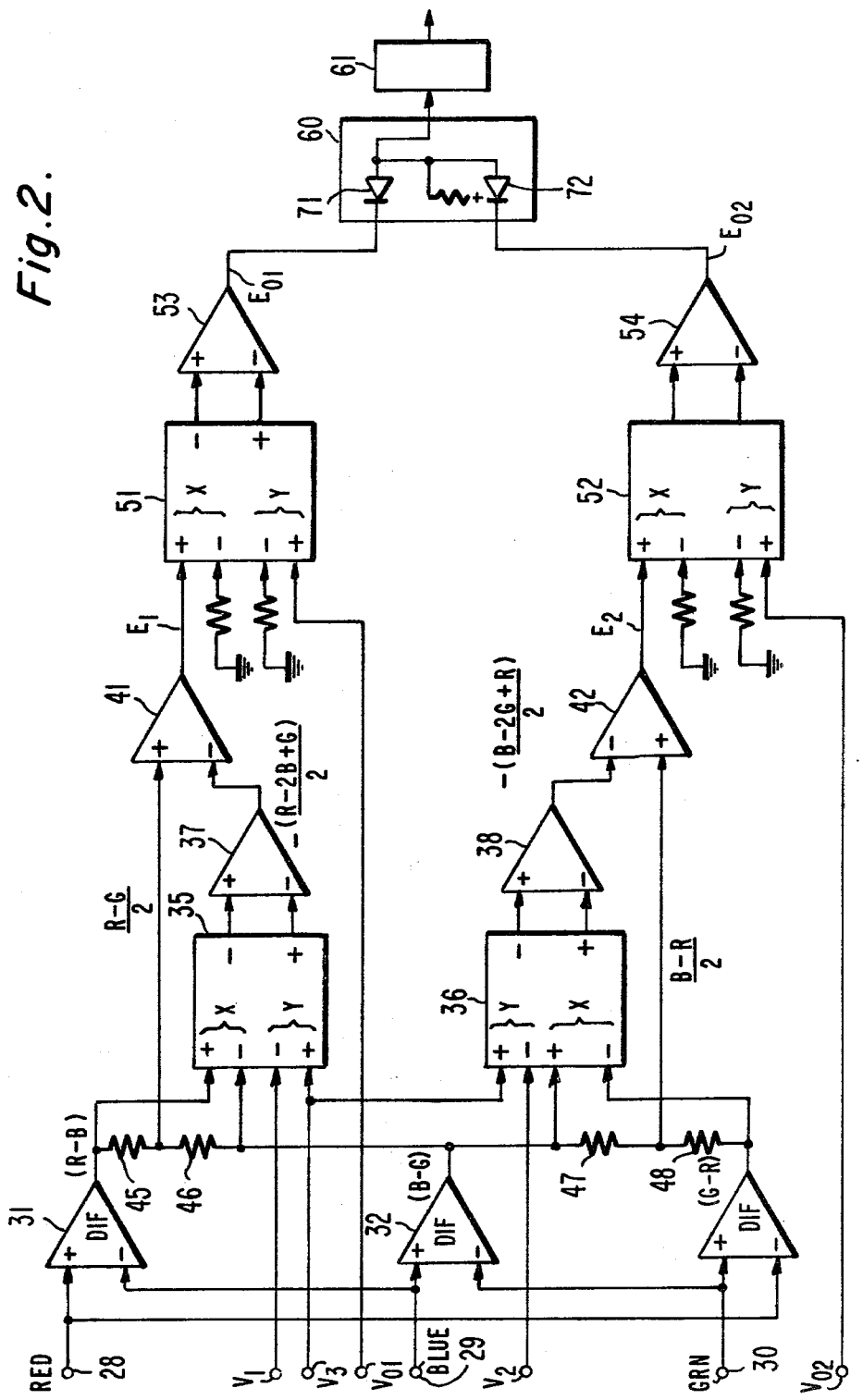
FIG. 2 is a diagram of a chroma key selector according to the present invention.

Referring now to FIG. 2, there is illustrated a block diagram of the chroma keyer 23 of FIG. 1. The red, blue and green signals from the camera 10 for example in FIG. 1 are applied to terminals 28, 29 and 30 in FIG. 2. The red and blue signals are combined in difference amplifier 31 to provide difference signal R−B. The blue and green signals are differentially combined at difference amplifier 32 to provide difference signal B−G. Similarly, the red and green signals are differentially combined at difference amplifier 33 to provide difference signal G−R at the output thereof. The three difference signals R−B, B−G and G−R are fed to the X inputs of two 4-quadrant multipliers 35 and 36. The R−B signal is applied to the +X terminal and the B−G signal is applied to the −X terminal of multiplier 35. The G−R signal is applied to the −X terminal of multiplier 36 and the B−G signal is applied to the +X terminal of multiplier 36. At the −Y input of multiplier 35 is applied a fixed voltage $V_1$ from remote unit 25 in FIG. 1. The other Y input (+Y input) of multiplier 35 is coupled to a variable D.C. voltage $V_3$ which is provided from the remote control unit 25 in FIG. 1. Similarly, a voltage $V_2$ is applied from the remote unit 25 to the −Y input of multiplier 36 and the variable D.C. voltage $V_3$ is also applied to the +Y input of multiplier 36. When the voltage $V_3$ is zero, the voltage $V_1$ and $V_2$ and the gain of the multipliers are such that the output of the multipliers 35 and 36 will have a relationship −(R−2B+G)/2 and −(B−2G+R)/2 respectively (the differential sum of the input signals). The difference signal −(R−2B+G)/2 is applied via operational amplifier 37 to the minus input terminal of difference amplifier 41. The difference signal −(B−2G+R)/2 is applied to the minus input of difference amplifier 42 via operational amplifier 38. The multipliers 35 and 36 are of the 4-quadrant type and may be, for example, Motorola MC1595, with the outputs taken at terminals 2 and 14. In order to increase the gain and level shift the average value to zero in these multipliers, the outputs at terminals 14 and 2 of both multipliers are differentially summed by the difference amplifiers 37 and 38 with the minus terminal coupled to terminal 2 and plus terminal coupled to terminal 14. The R−B signal and the B−G signals from difference amplifiers 31 and 32 are additively summed via equal valued resistors 45 and 46 to produce an R−G/2 signal which is applied to the plus terminal of difference amplifier 41. The B−G and G−R signals are additively summed via equal valued resistors 47 and 48 to produce a B−R/2 signal which is applied to the plus terminal of difference amplifier 42. The additively summed signal R−G/2 is differentially summed with the −(R−2B+G) signal at amplifier 41 and the additively summed signal B−R/2 is differentially summed with the −(B−2G+R)/2 signal at amplifier 42. When the voltage $V_3$ to the multiplier is zero and the voltages $V_1$ and $V_2$ are both equal to −2 for example, the outputs are the R−B difference signal from differential amplifier 41 (at $E_1$) and B−G difference signal out of differential amplifier 42 (at $E_2$). See Table 1.

TABLE 3

| Color Output From NAM | Cont 1 | Cont 2 | Cont 3 | Output | Cont 4 | Cont 5 | | Output to NAM | |
|---|---|---|---|---|---|---|---|---|---|
| Color | $V_1$ | $V_2$ | $V_3$ | $E_1$ | $E_2$ | $V_{01}$ | $V_{02}$ | $E_{01}$ | $E_{02}$ |
| Blue | −2 | −2 | 0 | R-B | B-G | −2 | +2 | B-R | B-G |
| Blu-Mag | −2 | +2 | 0 | R-B | G-R | −2 | −2 | B-R | R-G |
| Mag | +2 | +2 | 0 | B-G | G-R | +2 | −2 | B-G | R-G |
| Mag-Red | −2 | −2 | 0 | R-B | B-G | +2 | +2 | R-B | B-G |
| Red | −2 | +2 | 0 | R-B | G-R | +2 | −2 | R-B | R-G |
| Red-Yel | +2 | +2 | 0 | B-G | G-R | −2 | −2 | G-B | R-G |
| Yel | −2 | −2 | 0 | R-B | B-G | +2 | −2 | R-B | G-B |
| Yel-Grn | −2 | +2 | 0 | R-B | G-R | +2 | +2 | R-B | G-R |
| Grn | +2 | +2 | 0 | B-G | G-R | −2 | +2 | G-B | G-R |
| Grn-Cyn | −2 | −2 | 0 | R-B | B-G | −2 | −2 | B-R | G-B |
| Cyn | −2 | +2 | 0 | R-B | G-R | −2 | +2 | B-R | G-R |
| Cyn-Blu | +2 | +2 | 0 | B-G | G-R | +2 | +2 | B-G | G-R |

Referring to Table 1, there is illustrated for the chroma keyer voltages the output differences signal at $E_1$ and $E_2$. When the $V_1$ and $V_2$ voltage signals are both +2 volts with $V_3=0$, the outputs at $E_1$ and $E_2$ are respectively B−G and G−R. When the voltage at $V_2$ equals a +2 volts and $V_1$ equals a −2 volts the output at $E_1$ is R−B but the output at $E_2$ is G−R. When the voltage is switched from −2 volts to +2 volts, the sign of the output difference signal changes and the phase of the difference signal is reversed. The output from difference amplifier 41 is coupled to a third 4-quadrant multiplier 51, and more particularly to the +X terminal of that multiplier. The −X input terminal of multiplier 51 is coupled to a reference potential or ground. Similarly, the output from difference amplifier 42 is applied to +X terminal of a fourth 4-quadrant multiplier 52. The −X input terminal of multiplier 52 is also coupled to ground or reference potential. The −Y terminals of multipliers 51 and 52 are coupled to the reference at about ground. Some adjustment above or below ground may be added for symmetry. To the +Y terminal of the multiplier 51 is applied voltage $V_{01}$ and to the −Y terminal of multiplier 52 is applied voltage $V_{02}$. These $V_{01}$ and $V_{02}$ voltages like $V_1$, $V_2$ and $V_3$ are from remote control source 25. If the voltage to the +Y inputs of the multipliers is +2 volts ($V_{01}=+2v$, $V_{02}=+2$ V), the signal applied to the multipliers is coupled directly out of these multipliers without any inversion of the sign or phase of the signals. However, if a −2 volts is applied to any +Y input of the multipliers ($V_{01}=-2$ V, $V_{02}=-2v$) that particular signal is inverted. For example, if an R−B signal is applied to the third multiplier 51 and $V_{01}=-2$ volt, the signal out of the multiplier 51 ($E_{01}$) is inverted and is B−R. See Table 1. The difference signals out of the multipliers 51 and 52 are non-additively mixed in NAM mixer 60. The mixer 60 processes the difference signals applied to pass the colors according to Table 1 with sufficient amplitude to overcome the threshold level of device 61. For example the B−R and B−G signals when combined permit only blue to act as a keying signal out of device 61. The non-additive mixer 60 operates to provide an output color that appears in both channels at a certain time in a given polarity direction (negative for the example). The mixer includes for example diodes 71 and 72. The portion of the signals R−B and B−G that is most negative appears out of mixer 60 while blocking the other signal. For an example of a non-additive mixer, see Hurford U.S. Pat. No. 3,371,160. As noted by the combinations of the +2 and −2 volts for $V_1$, $V_2$, $V_{01}$ and $V_{02}$ from remote control unit 25 to the multipliers 35, 36, 51 and 52, a selected color of blue, blue-magenta, magenta, magenta-red, red, red-yellow, yellow, yellow-green, green, green-cyan, cyan, cyan-blue to blue is provided. The keying signal is amplified and delayed so as to match the delay in the encoder 15 to be applied coincident in time with the camera signal at the electronic switch 21 in a special effects device 20. The device lends itself to remote controlling with the chroma keyer 23 located in the camera. The remote voltages $V_1$, $V_2$, $V_3$, $V_{01}$ and $V_{02}$ are sent to the camera via the cable control from remote unit 25 located for example at the operator's console in the studio control room. A selector switch on the remote unit selects the appropriate voltages (+2 or −2 V) for the colors on the left column of Table 1.

If we vary the $V_3$ voltage we may provide selective colors between these switched colors provided in Table 1. If we vary $V_3$ to equal $V_1$ we vary the gain so that when $-(R-2B+G)/2=0$ and $-(B-2G+R)/2=0$, the output signal $E_1$ then equals $R-G/2$ and the $E_2$ equals $B-R/2$ since the input to the negative input terminals of difference amplifiers 41 and 42 are both zero. The color output for these values for example would change the color selectivity from magenta-red for example with $V_3=0 (V_1+V_2=-2, V_{01}+V_{02}=+2)$ to magenta-blue $V_3=-2$. This means that by varying the $V_3$ voltage from 0 to +2 V we can change to any color of the output of mixer 60 from magenta-red to magenta-blue.

TABLE 2

| $V_1$ | $V_2$ | $V_3$ | $E_{01}$ | $E_{02}$ | Color |
|---|---|---|---|---|---|
| −2 | −2 | 0 | R-B | B-G | Mag - Red |
| −2 | −2 | −2 | $\frac{R-G}{2}$ | $\frac{B-R}{2}$ | Mag - Blu |
| +2 | +2 | 0 | B-G | G-R | Blu - Cyan |
| +2 | +2 | +2 | $\frac{R-G}{2}$ | $\frac{B-R}{2}$ | Blu - Mag |

Referring to Table 2, there is illustrated for example for voltages $V_1$ and $V_2$ and $V_3$ how the colors may be changed from magenta-red to magenta-blue to blue-cyan to blue-magenta. By selecting the proper values for $V_1$ and $V_2$ we can obtain all major colors and by varying $V_3$ we can obtain the colors in between.

What is claimed is:

1. An apparatus responsive to red, green and blue video signals from a video source such as a TV camera for selecting any desired color signal comprising:
   means responsive to said red, green and blue signals to produce red and blue, blue and green and green and red difference signals,
   first differential summing means coupled to said first means for differentially summing a first and either said first or said second difference signal of said difference signals to produce a fourth difference signal,
   second differential summing means coupled to said first means for differentially summing a second and a third of said difference signals to produce a fifth difference signal,
   first additive means coupled to said first means for additively summing said first and second difference signals to provide a sixth signal,
   second additive means coupled to said first means for additively summing said second and third difference signals to provide a seventh signal,
   third differential summing means coupled to said first differential summing means and said first additive means for differentially summing said fourth difference signal and said sixth signal to provide an eighth difference signal and,
   fourth differential summing means coupled to said second differential summing means and said second additive means for differentially summing said fifth difference summing signal and said seventh signal for providing a ninth difference signal,
   means coupled to said third and fourth differential summing means for non-additive combining said eighth and ninth difference signal to provide a selected color signal and,
   means coupled to said first and second differential summing means for selectively reversing the phase of said fourth and fifth signal to thereby select a desired color signal.

2. The combination claimed in claim 1 wherein said first and second differential summing means includes a 4-quadrant multiplier with the difference signals coupled to the X terminals and said last mentioned means includes means for varying the voltages to the Y terminals of said 4-quadrant multiplier.

3. An apparatus responsive to red, green and blue video signals from a source such as a TV camera for selecting any desired color signal comprising:
   means responsive to said red, green and blue signals to produce red and blue, blue and green and green and red difference signals,
   first differential summing means coupled to said first means for differentially summing a first and a second of said difference signals to produce a fourth difference signal,
   second differential summing means coupled to said first means for differentially summing either said first or said second difference signal and a third of said difference signals to produce a fifth difference signal,
   first additive means coupled to said first means for additively summing said first and second difference signals to provide a sixth signal,
   second additive means coupled to said first means for additively summing said second and third difference signals to provide a seventh signal,
   third differential summing means coupled to said first differential summing means and said first additive means for differentially summing said fourth difference signal and said sixth signal to provide an eighth difference signal and,
   fourth differential summing means coupled to said differential summing means and said second additive means for differentially summing said fifth difference summing signal and said seventh signal for providing a ninth difference signal,
   mixing means coupled to said third and fourth differential summing means for non-additive combining said eighth and ninth difference signal to provide a selected color signal and, remote means coupled to said first and second differential summing means for selectively adjusting the gain of said fourth and fifth signal to thereby select a desired color signal.

4. The combination claimed in claim 3 wherein said first and second differential summing means includes a quadrant multiplier with the difference signals coupled to the x terminals and said last mentioned means includes remote means for varying the voltages to the Y terminals of said 4-quadrant multiplier.

5. An apparatus responsive to red, green and blue video signals from a source such as a TV camera for selecting any desired color signal comprising:
   means responsive to said red, green and blue signals to produce red and blue, blue and green and green and red difference signals,
   first differential summing means coupled to said first means for differentially summing a first and a second of said difference signals to produce a fourth difference signal,
   second differential summing means coupled to said first means for differentially summing either said first or said second difference signal and a third of said difference signals to produce a fifth difference signal,
   first additive means coupled to said first means for additively summing said first and second difference signals to provide a sixth signal,
   second additive means coupled to said first means for additively summing said second and third difference signals to provide a seventh signal,
   third differential summing means coupled to said first differential summing means and said first additive means for differentially summing said fourth difference signal and said sixth signal to provide an eighth difference signal and,
   fourth differential summing means coupled to said second differential summing means and said second additive means for differentially summing said fifth difference summing signal and said seventh signal for providing a ninth difference signal,
   mixing means coupled to said third and fourth differential summing means for non-additive combining said eighth and ninth difference signal to provide a selected color signal and,
   remote means coupled to said first and second differential summing means for selectively reversing the phase and adjusting the gain of said fourth and fifth signal to thereby select a desired color signal.

6. The combination claimed in claim 5 wherein said first and second differential summing means includes a quadrant multiplier with the difference signals coupled to the x terminals and said last mentioned means includes remote means for varying the voltages to the Y terminals of said 4-quadrant multiplier.

7. An apparatus responsive to red, green and blue video signals from a source such as a TV camera for remotely selecting any desired color signal comprising:
   means responsive to said red, green and blue signals to produce red and blue, blue and green and green and red difference signals,
   first differential summing means coupled to said first means for differentially summing a first and a second of said difference signals to produce a fourth difference signal of an amplitude and phase which is dependent upon first control signals applied thereto,
   second differential summing means coupled to said first means for differentially summing either said first or said second difference signal and a third of said difference signals to produce a fifth difference signal of an amplitude and phase which is dependent upon second control signals applied thereto,
   first additive means coupled to said first means for additively summing said first and second difference signals to provide a sixth signal,
   second additive means coupled to said first means for additively summing said second and third difference signals to provide a seventh signal,
   third differential summing means coupled to said first differential summing means and said first additive means for differentially summing said fourth difference signal and said sixth signal to provide an eighth difference signal,
   fourth differential summing means coupled to said second differential summing means and said second additive means for differentially summing said fifth difference summing signal and said seventh signal for providing a ninth difference signal,
   first reversible means coupled to said third differential summing means for selectively reversing the phase of said eighth signal in response to third control signals,
   second reversible means coupled to said fourth differential summing means for selectively reversing the phase of said ninth signal in response to fourth control signals,
   means coupled to said first and second differential summing means for non-additive combining said eighth and ninth difference signal to provide a selected color signal,
   remotely located means coupled to said first and second differential summing means and said first and second reversible means for selectively adjusting the gain and phase of said fourth and fifth signals by changing the first and second control signals and for selectively reversing the phase of said eighth and ninth signals by changing the third and fourth control signals to thereby select a desired color signal.

8. The combination of claim 7 wherein each of said first and second reversible means and said first and second differential summing means are 4-quadrant multipliers and said control signals are D.C. voltages.

* * * * *

UNITED STATES PATENT AND TRADEMARK OFFICE
CERTIFICATE OF CORRECTION

PATENT NO. : 4,183,045

DATED : January 8, 1980

INVENTOR(S) : Donald Charles Herrmann, et al.

It is certified that error appears in the above-identified patent and that said Letters Patent is hereby corrected as shown below:

Column 3, line 67, that portion reading "-(R-2B+G)" should read -- -(R-2B+G)/2 --; Column 4, line 8, that portion reading "TABLE 3" should read -- TABLE 1 --; Column 5, line 63, that portion reading "either said first or said second difference signal" should be deleted and -- a second -- should be substituted therefor; line 67, that portion reading "a second" should be deleted and -- either said first or said second difference signal -- should be substituted therefor.

Signed and Sealed this

First Day of April 1980

[SEAL]

Attest:

SIDNEY A. DIAMOND

Attesting Officer

Commissioner of Patents and Trademarks